Patented Mar. 17, 1925.

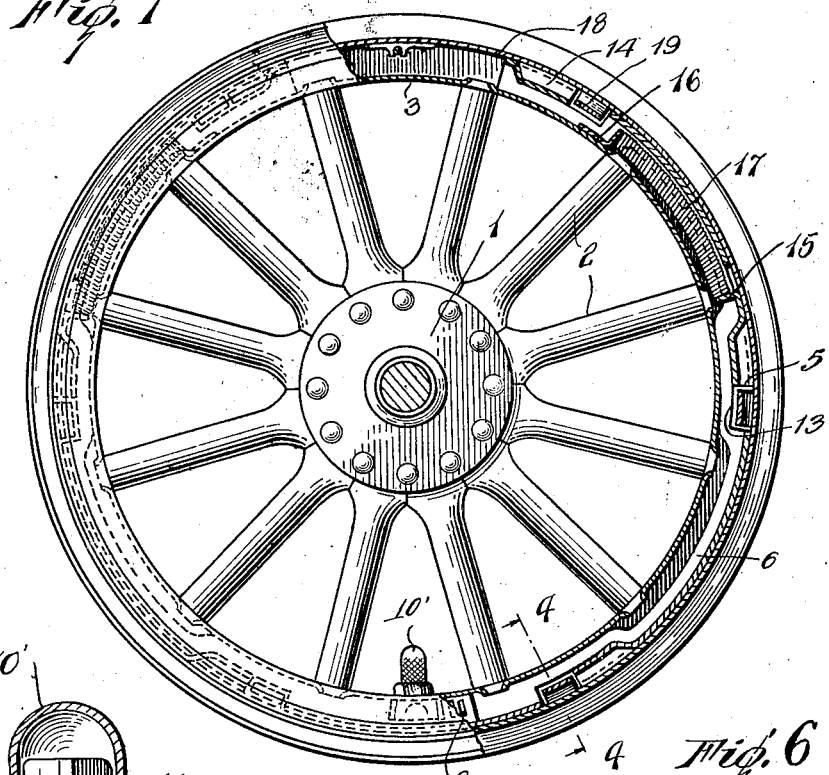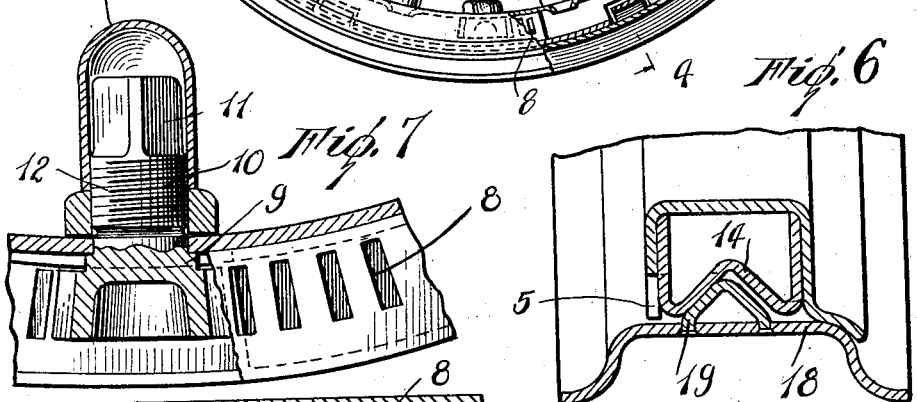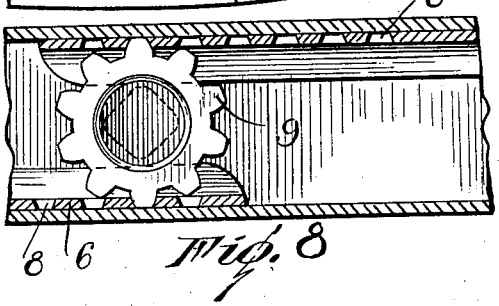

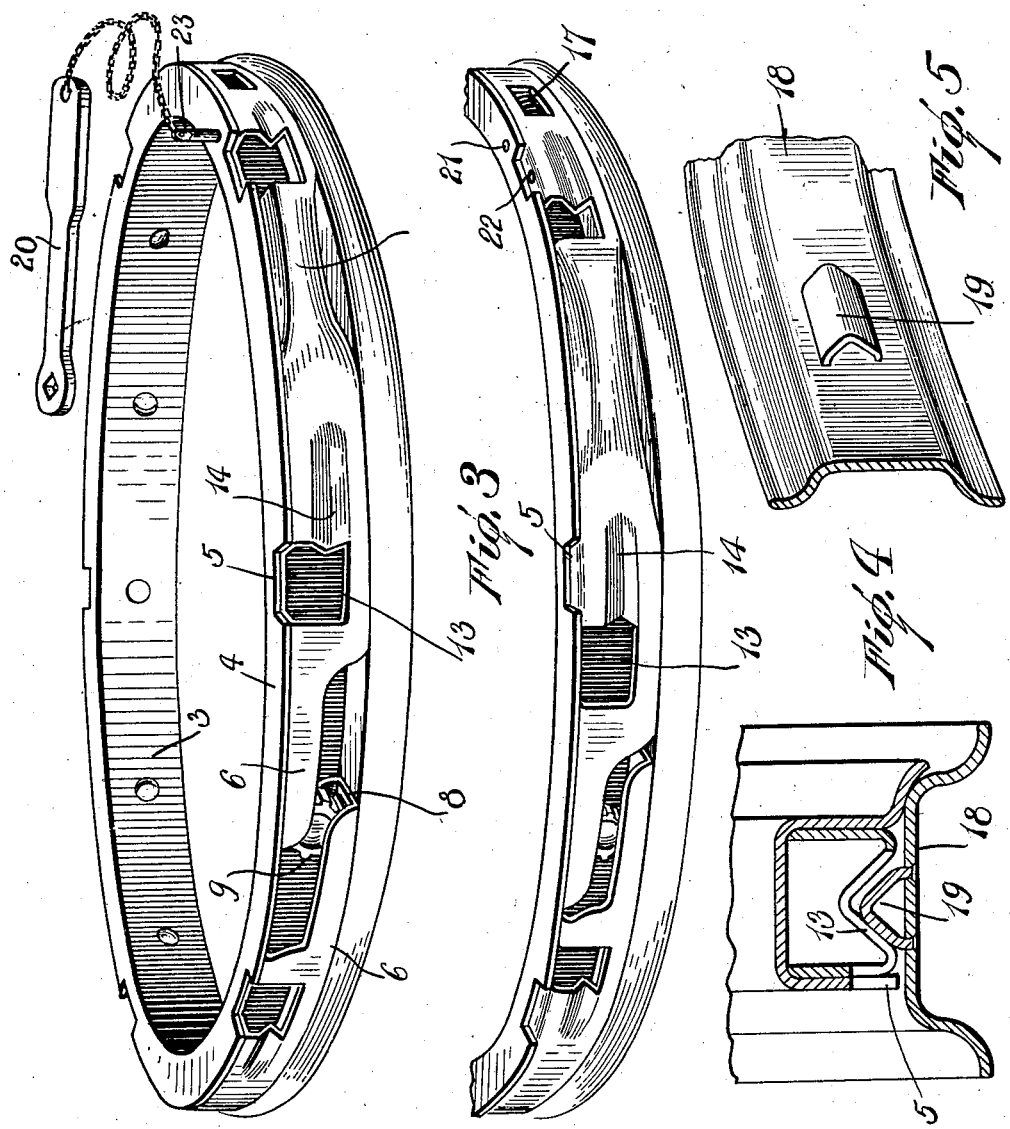

1,529,807

UNITED STATES PATENT OFFICE.

RODOLPHE PERRAULT, OF MONTREAL, QUEBEC, CANADA.

RIM-LOCKING DEVICE.

Application filed February 23, 1923. Serial No. 620,779.

*To all whom it may concern:*

Be it known that I, RODOLPHE PERRAULT, a subject of the King of Great Britain, residing at Montreal, Province of Quebec, Canada, have invented certain new and useful Improvements in Rim-Locking Devices; and I do hereby declare that the following is a full, clear, and exact description of the invention, such as will enable others skilled in the art to which it appertains to make and use the same.

The present invention pertains to a novel device for locking a tire rim to the felloe of a wheel.

The principal object of the invention is the provision of a device of this character which may be readily adjusted for the removal of a rim from the felloe or the application of a rim thereto, and subsequently readjusted for locking a new rim in position.

The invention comprises in general a pair of ring sections upon the circumference of the felloe, and springs which normally tend to press the sections together. The inner ends of the sections overlap and are formed with racks engageable by a pinion journaled to the felloe. By means of this device the sections may be separated at will against the action of the springs. The rim is formed with lugs which are constructed to lie in recesses formed in the ring sections when the latter are separated. The rim being thus adjusted, the springs are allowed to act to force the sections together, whereby the lugs are engaged by seats formed in the sections adjacent the recesses. In this manner the ring is locked against circumferential and lateral shifting.

The invention is fully disclosed in the following description and in the accompanying drawings in which:—

Figure 1 is a side elevation partly in section of an automobile wheel having the invention applied thereto;

Figure 2 is a perspective view of the felloe and locking ring, the latter being in release position;

Figure 3 is a similar view with the locking ring in operative position;

Figure 4 is a section on the line 4—4 of Figure 1;

Figure 5 is a fragmentary perspective view of the inner surface of the rim;

Figure 6 is a sectional view similar to Figure 4 showing the ring in locking position;

Figure 7 is a fragmentary sectional view of the rack and pinion device; and,

Figure 8 is a fragmentary section perpendicular to that of Figure 7.

In the above views in which like reference characters are employed to designate corresponding parts throughout, the numeral 1 indicates the hub of a wheel from which radiate a plurality of spokes 2, the outer ends of the spokes being engaged by a felloe 3. One of the lateral flanges 4 of the felloe is slotted at intervals as at 5 for a purpose pointed out below.

Between the side flanges of the felloe and around the circumference thereof are disposed a pair of arcuate members 6 constituting a locking ring for the rim. The meeting ends of these members are reduced and slotted as at 8 to form racks engageable by a pinion 9 journaled in the body of the felloe. A stem 10 extends inwardly from the pinion through the base of the felloe and has its end squared as at 11 for the accommodation of a key. The stem is also threaded as at 12 to receive a cap 10'.

Each of the ring sections is formed with a plurality of recesses 13 corresponding in number to the slots 5 and adapted to register therewith when the sections are in release position, as shown in Figure 2. Adjacent each of the recesses 13, a seat or depression 14 is formed in the member 6 and communicates with the recess. A substantially square member 15 is cut out of the intermediate portion of each arcuate member and bent inwardly, as shown in Figure 1. To the outer surface of the felloe is secured a fixed stop member 16 spaced from the flange 15 and adapted to engage one end of a spring 17, the other end of which bears against the flange. The rim 18 is formed on its inner surface with a plurality of lugs 19 corresponding in number to the slots 5 and recesses 13.

In use, the ring sections tend to assume the position shown in Figure 3 because of the pressure of the springs 17 against the flanges 15. When it is desired to remove a rim or apply a new one, the cap 10' is removed and the stem 10 turned to separate the ring sections. For this purpose the key 20 is suitable. The flange 4 and one of the sections 6 are formed with apertures 21 and 22 respectively which are adapted to register when the recesses 13 are aligned with the slots 5. A pin 23 is passed through the apertures to hold the parts in release position. The rim 18 may now be pased upon the felloe, the lug 19 passing through the slots 5 and entering the recesses 13. The pin 23 is now removed and the force of the springs is free to push the ring sections together whereby the seats 14 move beneath the lugs. The rim is now locked upon the felloe, it being prevented from circumferential shifting because of the lugs 19 lying in the recesses 13, and from lateral shifting because of the seats 14 being disposed beneath the lugs.

While a specific embodiment of the invention has been illustrated and described, it is to be understood that various alterations in the details of construction may be made without departing from the spirit of the invention as indicated by the appended claims.

Having thus fully described the invention, what I claim as new and desire to protect by Letters Patent is:—

1. A rim locking device comprising in combination with a flanged felloe having slots formed in the flange, a pair of arcuate ring sections disposed upon the circumference of the felloe and provided with recesses adapted to register with said slots, said sections having depressed seats formed therein adjacent said recesses, stop members fixed to said felloe, springs bearing against said stop members and sections and adapted to force the latter together, and means for forcing said sections apart.

2. A rim locking device comprising in combination with a flanged felloe having slots formed in the flange, a pair of arcuate ring sections disposed upon the circumference of the felloe and provided with recesses adapted to register with said slots, said sections having depressed seats formed therein adjacent said recesses, stop members fixed to said felloe, springs bearing against said stop members and sections and adapted to force the latter together, and means for forcing said sections apart, the felloe flange and one of said sections being provided with apertures adapted to register when the recess is in registration with the slot.

3. A rim locking device comprising in combination with a flanged felloe having slots formed in the flange, a pair of arcuate ring sections disposed upon the circumference of the felloe and provided with recesses adapted to register with said slots, said sections having depressed seats formed therein adjacent said recesses, stop members fixed to said felloe, springs bearing against said stop members and sections and adapted to force the latter together, means for forcing said sections apart, and a rim having lugs on its inner surface adapted to pass through said slots and into the recesses, said lugs being engageable by said seats.

4. In combination with a felloe having a flange and slots formed therein, a rim locking device comprising a pair of ring sections disposed upon the circumference of the felloe, the meeting ends of said sections overlapping and being formed with racks, a rotatable pinion journaled to the felloe and engaging said racks, said sections being formed with recesses adapted to register with the slots when the sections are separated, seats formed in said sections adjacent the recesses, fixed stop members secured to the felloe, flanges bent inwardly from said sections and spaced from the stop members, springs bearing against said stop members and flanges and adapted to force said sections together.

5. In combination with a felloe having a flange and slots formed therein, a rim locking device comprising a pair of ring sections disposed upon the circumference of the felloe, the meeting ends of said sections overlapping and being formed with racks, a rotatable pinion journaled to the felloe and engaging said racks, said sections being formed with recesses adapted to register with the slots when the sections are separated, said felloe flange and one of the ring sections being formed with aperture adapted to register when the recesses are in registration with the slots, seats formed in said sections adjacent the recesses, fixed stop members secured to the felloe, flanges bent inwardly from said sections and spaced from the stop members, springs bearing against said stop members and flanges and adapted to force said sections together.

6. In combination with a felloe having a flange and slots formed therein, a rim locking device comprising a pair of ring sections disposed upon the circumference of the felloe, the meeting ends of said sections overlapping and being formed with racks, a rotatable pinion journaled to the felloe and engaging said racks, said sections being formed with recesses adapted to register with the slots when the sections are separated, seats formed in said sections adjacent the recesses, fixed stop members secured to the felloe, flanges bent inwardly from said sections and spaced from the stop members, springs bearing against said stop members and flanges and adapted to force said sections together, and a rim having lugs formed on its inner surface adapted to pass through said slots and into the recesses.

7. In combination with a felloe having a flange and slots formed therein, a rim locking device comprising a pair of ring sections disposed upon the circumference of the felloe, the meeting ends of said sections overlapping and being formed with racks, a rotatable pinion journaled to the felloe and engaging said racks, said sections being formed with recesses adapted to register with the slots when the sections are separated, said felloe flange and one of the ring sections being formed with apertures adapted to register when the recesses are in registration with the slots, seats formed in said sections adjacent the recesses, fixed stop members secured to the felloe, flanges bent inwardly from said sections and spaced from the stop members, springs bearing against said stop members and flanges and adapted to force said sections together, and a rim having lugs formed on its inner surface adapted to pass through said slots and into the recesses.

8. In combination with a felloe having a flange and slots formed therein, a rim locking device comprising a pair of ring sections disposed upon the circumference of the felloe, the meeting ends of said sections overlapping and being formed with racks, a rotatable pinion journaled to the felloe and engaging said racks, said sections being formed with recesses adapted to register with the slots when the sections are separated, seats formed in said sections adjacent the recesses, fixed stop members secured to the felloe, flanges bent inwardly from said sections and spaced from the stop members, springs bearing against said stop members and flanges and adapted to force said sections together, said pinion having the stem passing through the felloe adapted for accommodating a key.

In witness whereof I have hereunto set my hand.

RODOLPHE PERRAULT.